(12) United States Patent
Scaringe et al.

(10) Patent No.: US 6,327,897 B1
(45) Date of Patent: *Dec. 11, 2001

(54) METHOD OF INTRODUCING AN IN SITUANT INTO A VAPOR COMPRESSION SYSTEM, ESPECIALLY USEFUL FOR LEAK DETECTION, AS WELL AS AN APPARATUS FOR LEAK DETECTION AND A COMPOSITION USEFUL FOR LEAK DETECTION

(75) Inventors: Robert Peter Scaringe, Rockledge; Lawrence R. Grzyll, Merritt Island; Dwight D. Back, Melbourne; Joseph Mayer, Indian Harbor Beach; John A. Meyer, Palm Bay, all of FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/095,513

(22) Filed: Jun. 11, 1998

Related U.S. Application Data (63) Continuation-in-part of application No. 08/788,780, filed on Jan. 24, 1997.

(51) Int. Cl.$^7$ .............................. G01M 3/04; G01M 3/20
(52) U.S. Cl. ..................... 73/40.7; 73/40.5; 252/301.19
(58) Field of Search .................................. 73/40, 40.5 R, 73/40.7, 49.2, 49.3; 250/301, 302; 252/301.19, 301.16, 301.33; 503/583

(56) References Cited

U.S. PATENT DOCUMENTS

Re. 35,395 * 12/1996 Henry ...................................... 73/40.7
868,779   10/1907  Hammer ........................... 252/301.33
1,915,965  6/1933  Williams .
2,472,522 *  6/1949  de Forest ................................ 73/49.3
2,920,203 *  1/1960  Switzer ................................ 250/302
3,386,920  6/1968  Alburger .
3,567,932 *  3/1971  Alburger ............................... 250/302

(List continued on next page.)

FOREIGN PATENT DOCUMENTS

92/07249     4/1992 (WO) .
WO 92/07249 * 4/1992 (WO) .

OTHER PUBLICATIONS

Beilstein on STN on–line, Registry Numbers 508755 and 390030, as disclosed in the listed corresponding references.*
Skoog, "Principles of Instrumental Analysis", 1985, pp. 225–239.*
Skoog, Douglas A. and West, Donald M., *Principles of Instrumental Analysis*, Second Edition, Saunders College, 1980, Figures 5–2, p. 116.
van der Waal, G., *Improving the Performance of Synthetic Base Fluids with Additives*, J. Synth. Lubr., vol. 4, No. 4, pp. 267–282, (1987).

*Primary Examiner*—Hezron Williams
*Assistant Examiner*—Michael Cygan
(74) *Attorney, Agent, or Firm*—Crowell & Moring LLP (57) ABSTRACT

Leaks are detected in a vapor compression system using fluorescent and daylight visible in situants which are introduced to a system by way of a carrier and dissolved into the systems oil or lubricant. This invention teaches the use of POE oil as a universal carrier fluid, alone or in combination with an alcohol, and combined with one or more "in situants". The in situants are compounds which are the same or substantially similar to compounds already present in oils or lubricants. An on-off UV light source, such as a xenon light, can the be used to visually detect the leak from the vapor compression system components.

36 Claims, 5 Drawing Sheets

U.S. PATENT DOCUMENTS

| | | | |
|---|---|---|---|
| 3,625,988 | 12/1971 | Cyba | 508/683 |
| 3,640,889 | 2/1972 | Stowart | 252/301.15 |
| 3,944,492 | 3/1976 | Wheeler | 252/50 |
| 4,064,059 | 12/1977 | Nebzydoski et al. | 252/49.9 |
| 4,112,335 * | 9/1978 | Gonser | 250/504 H |
| 4,157,970 | 6/1979 | Yaffe et al. | |
| 4,179,386 | 12/1979 | Reinhard et al. | |
| 4,201,683 | 5/1980 | Brewster | 252/32.7 E |
| 4,229,658 * | 10/1980 | Gonser | 250/504 R |
| 4,243,547 * | 1/1981 | Molina | 73/40.7 |
| 4,249,412 | 2/1981 | Townsend, III | 73/40.7 |
| 4,279,254 | 7/1981 | Boschetti et al. | 128/395 |
| 4,320,018 | 3/1982 | Yaffe | |
| 4,369,120 | 1/1983 | Stelz et al. | 252/68 |
| 4,544,496 * | 10/1985 | Claussen et al. | 250/301.16 |
| 4,550,275 | 10/1985 | O'Loughlin | 315/241 R |
| 4,641,518 | 2/1987 | Hutchings | 252/301.19 |
| 4,708,810 * | 11/1987 | Askew et al. | 508/275 |
| 4,758,366 * | 7/1988 | Parekh | 252/68 |
| 4,984,524 | 1/1991 | Kapuscinski et al. | 252/51.2 |
| 5,043,634 * | 8/1991 | Rothwell, Jr. et al. | 315/246 |
| 5,147,569 | 9/1992 | DeRosa et al. | 252/47.5 |
| 5,149,453 | 9/1992 | Parekh | 252/68 |
| 5,167,140 | 12/1992 | Cooper et al. | 73/40.7 |
| 5,185,552 | 2/1993 | Suzuki et al. | 313/231.71 |
| 5,271,856 | 12/1993 | Patil et al. | 252/50 |
| 5,357,782 | 10/1994 | Henry | 73/40.7 |
| 5,424,440 * | 6/1995 | Klem et al. | 548/114 |
| 5,440,919 * | 8/1995 | Cooper | 73/40.7 |
| 5,523,008 | 6/1996 | Boden et al. | 252/50 |
| 5,605,650 | 2/1997 | Cleary | 252/301.35 |
| 5,916,427 * | 6/1999 | Kirkpatrick | 204/469 |

* cited by examiner

METHOD OF INTRODUCING AN IN SITUANT INTO A VAPOR COMPRESSION SYSTEM, ESPECIALLY USEFUL FOR LEAK DETECTION, AS WELL AS AN APPARATUS FOR LEAK DETECTION AND A COMPOSITION USEFUL FOR LEAK DETECTION

This application is a continuation-in-part of U.S. application Ser. No. 08/788,780 filed on Jan. 24, 1997.

BACKGROUND AND SUMMARY OF THE INVENTION

The present invention is related to a method of introducing an in situant into a vapor compression system, as well as to a method for detecting leaks in the system components and an apparatus and composition useful for leak detection. "In situants" are defined as compounds which are the same or substantially similar to compounds already present in oils or lubricants, and which exhibit fluorescence and/or daylight visible qualities.

Daylight visible and ultraviolet fluorescent dyes have been used to detect leaks in refrigeration systems utilizing fluorocarbon refrigerants and refrigerant oils. Typically, these dyes are introduced into the refrigeration system, and at the site of the leak, the leaking refrigerant, oil and dye are detected under normal or UV light. The term "dye" in the context of leak detection generally refers to a compound that is distinctively different or unintentionally similar to components in the host fluid, having the specific purpose of generating a detectable color from a fluid. Typical dyes used by the industry up to present include blue anilino-anthraquinones, xanthenes, perylenes, and naphthalimides.

More specifically, a leak-detecting trace fluid, which is generally a fluorescence (powdered) dye material dissolved in an oil or petroleum fraction carrier, is introduced into the refrigeration system. The fluorescent dye material is carried throughout the system, and at the location of a leak, the refrigerant, oil, and fluorescent dye material leak into the atmosphere. The refrigerant is subsequently vaporized, leaving an oil residue containing the fluorescent dye material. Application of a UV light to this area results in the illumination of the oil/fluorescent dye material. The primary factors in selecting these dyes for use in leak detection is that the dyes are soluble in the host fluid, and that the dyes are used in such low concentrations that their presence does not alter the intended normal function of the host fluid.

U.S. Pat. No. 1,915,965 discloses a leak detector method for a compression refrigeration system. Daylight visible compounds, such as methyl violet, crystal violet, auramine B, rhodamine E, etc. are added to such systems as leak detectors.

U.S. Pat. No. 4,249,412 discloses a UV fluorescent dye composition comprising water, a nonionic surfactant, a 1.0 wt. % sodium fluorescein and a semi-synthetic thickening agent. This fluorescent dye composition is sprayed on the external surfaces of a system where the bubbles formed by the leak fluoresce under UV light.

Other references include U.S. Pat. No. 4,369,120, which discloses anilino anthraquinone blue dyes (methyl-ethylanilino, dimethylanilino, and trimethylanilino anthraquinones) for use as visual leak detectors of refrigerants, refrigerant oils, and mixtures thereof; U.S. Pat. No. 4,758,366, which discloses a UV fluorescent dye composition comprising a polyhalogenated hydrocarbon refrigerant, a refrigeration oil, or a mixture thereof, with a fluorescent dye such as naphthoxanthenes, perylenes, or naphthalene; U.S. Pat. No. 5,149,453, which discloses a fluorescent dye composition comprising an effective amount of a fluorescent, alkyl substituted perylene dye combined with a refrigerant oil and a polyhalogenated hydrocarbon refrigerant; U.S. Pat. No. 5,357,782, which discloses a UV fluorescent dye composition comprising an optical naphthalimide brightener mixed with either mineral oil, polyalkylene glycol or polyol ester refrigeration lubricant; U.S. Pat. No. 5,167,140, which discloses a method of adding a fluorescent dye solution into a system with an atomizing mist infuser, wherein four different formulas for the fluorescent dye solution are disclosed, wherein the dye solution is a fluorescent dye mixed with an appropriate refrigerant oil; WO 92/07249, which discloses a method and a sensor system for detecting hydrocarbon-containing fluids by fluorescent detection, wherein additives typically used in hydrocarbon-based fluids, such as gasoline, heating oils and motor oils, can fluoresce, and can be used to detect and locate the source of ground water contamination from gasoline and oil storage tanks using a fluorescent sensor which detects the presence of fluorescing materials such as Coumarin 153. The use of Coumarin 153 in ppm concentrations for this purpose does not degrade the performance properties of the particular hydrocarbon or oil. Moreover, coumarin compounds are related in structure and derivation to anthraquinones, which are sometimes used to improve oxidation stability.

Furthermore, U.S. Pat. No. 5,440,919, discloses a method of introducing a UV fluorescent dye additive into a closed refrigeration system by placing the fluorescent dye on a swatch of material installed in a desiccant bag which is placed in a dehydrator or filter (i.e. filter-dryer) of the refrigeration system. The swatch is capable of releasing as well as adsorbing the dye. The refrigerant and system lubricant flow through the dehydrator and are then mixed with the fluorescent dye, thereby allowing the fluorescent dye to be carried throughout the system. Although this system allows the introduction of the fluorescent dye into the system without requiring the use of a carrier oil, it also requires that the dehydrator or filter-dryer of the system be changed in order to introduce the dye into the system.

U.S. Pat. No. 3,386,920 teaches the composition of a fluorescent and daylight visible dye dissolved in solvents such as alcohols and oils to detect surface defects by applying the solution to a surface containing the defect, wiping excess solution off of the surface, and allowing the solutions to exude from the defect for detection. This reference does not teach the advantages of using a carrier fluid or solvent which is compatible or soluble in the fluid used in the process for which the defect is located, nor is there any preference for using dyes which are in situants to the fluid located on either side of the wall wherein the defect is located. The compounds suggested for use by this reference include coumarins, dibenzothiophene, azole dyes, perylene dyes, and pyridotriazoles.

U.S. Pat. No. 4,201,683 teaches an anti-friction solution comprised of anti-friction compounds and C5–C50 alkanols added to equipment having moving parts operating under boundary lubricating conditions. This reference does not teach the method of introducing the solution to a system under pressure nor does it teach that these compounds could be selected from in situants in the system's oil or lubricant. This reference also does not teach that certain performance improving compounds exhibit fluorescent qualities which when added to the system can be used to detect leaks.

U.S. Pat. Nos. 4,157,970, 4,179,386, and 4,320,018 all teach compositions containing polyhydroxy anthraquinones for improving oxidation stability in lubricating fluids. Thus, polyhydroxy anthraquinones would be considered an in situant.

U.S. Pat. No. 4,641,518 teaches a method to detect surface defects by applying a solution comprised by one embodiment of 7-diethylamino-4-methylcoumarin in isopropanol, wiping away excess solution, and applying a developer solution to absorb the fluorescent dyes from the surface defect. This reference does not require or prefer any specific fluorescent dyes which are in situants to the system which is being analyzed for surface defects, nor are oils taught as the carrier fluid. A method to inject the fluorescent or dye solution into a pressurized system is also not taught. This patent also appears to be for finding defects on static surfaces in ambient by spreading the solution over large areas and then observing where the fluorescence emanates from. This is in contrast to the current invention whereby the in situant chemicals are used to detect leaks in flowing systems, as in the case of vapor compression refrigeration, and the outer surface at which the leak is detected does not need to be prepared or coated in any form prior to detecting for leaks.

U.S. Pat. No. 5,605,650 teaches a composition comprised of one or more fluorescent dyes in a volatile solvent for use in detecting tampering. This reference does not teach the use of oil carrier with preferred in situant fluorescent materials which are common to lubricants or oils used in a vapor compression system. Moreover, the specification that the carrier be volatile would not be applicable to the current invention since the leak detection method is facilitated by the concentrated presence of an in situant in the POE carrier and system oil after the refrigerant/system oil/carrier fluid/fluorescent compound solution leaks from the system and the refrigerant evaporates thereby concentrating the fluorescent in situant making its visibility improve with time.

Generally speaking, the standard industry method of introducing daylight visible or fluorescent dyes into a refrigerant oil, has been to dissolve the dye in the o refrigeration oil and to introduce this mixture into the system. There are however currently several different types of oils that are used in refrigeration systems. For example, polyalkylene glycol (PAG), polyol ester (POE), alkylbenzene (AB) and mineral oils are all used in current systems and some of these oils (or their additives) are incompatible with one another in concentrations as low as 1%. This means that a service technician must carry an inventory of all different types of fluorescent dye mixtures, i.e. one for each oil type.

An even greater problem with the conventional approach is that the technician must first determine which type of oil is used in the system which is being checked for leaks, as often, the technician is called upon to repair a leak in a system which has not been previously serviced and in which the oil used is unknown. This presents a significant problem. We have recognized that a more universal fluorescent leak check solution which is compatible with all potential lubricants and delivery method is needed to simplify leak detection in refrigeration systems.

The inventors have also taught the advantages of using an alcohol carrier fluid for leak detection (U.S. patent application Ser. No. 08/788,780). Namely, certain alcohols will dissolve daylight visible dyes and fluorescent compounds and are miscible with refrigerants and oils used in vapor compression refrigeration systems. This carrier can then be removed after functioning as a carrier for the dye or fluorescent agent.

The type of daylight visible or fluorescent material used for leak detection is also critical because the additives used in oils can interact with the material or the material could directly and negatively affect the properties of the oil or refrigerant. Although the quantity of material used for fluorescent leak detection is generally small, on the order of a few percent by weight of oil or less, a material can adversely affect the properties or performance of the oil or refrigerant to which it is added. The materials having fluorescence properties in accordance with the present invention are usually solid at room temperature, and are selected from a group of commercially available compounds, the same or substantially similar to those already used in the oil manufacturing industry as additives to promote the performance characteristics of oil. Many of these industry-added additive materials are also soluble in lubricants and oils, whether the oil is petroleum-derived (mineral) or synthetic but up until now their ability to fluoresce has not been appreciated.

The problems and disadvantages of current leak detection methods (i.e., introducing fluorescent and daylight-visible compounds using different carrier fluids for each type of oil) can be circumvented by replacing a part of or all of an alcohol carrier fluid with a POE (polyol ester) oil. POE oils are useful for this invention since they are generally universally miscible at low concentrations with other oils including AB, PAG, and mineral oils (whereas, AB, PAG, and mineral are not universally miscible in the other oils including POE) and POE oils can dissolve many fluorescent compounds and daylight visible dyes making POE oil an ideal carrier for administering the fluorescent or daylight-visible in situants into a refrigeration or lubrication system. The use of POE oil as a complete or partial replacement for an alcohol carrier fluid also does not require the additional step of removing the POE carrier fluid component by filtration after use as a carrier. Another advantage of using POE oil in solution with an alcohol as the carrier fluid is that the differences in chemical structure between POE oil and alcohols will allow for the dissolution of varying amounts of different fluorescent and daylight-visible in situants not possible with each component, alcohol or POE oil, alone. In other words, multi-component carriers allow for the possibility of more, and different, in situants to be added to the vapor compression system.

Another advantage of using POE oil as a carrier fluid is that many fluorescent or daylight-visible compounds, or families thereof, have equal or better solubility in POE oil compared to other oils, and similar solubilities compared to alcohols. For example, we have measured the solubility of the fluorescent compounds, N-phenyl-1-naphthylamine and N-phenyl-2-naphthylamine in two different POE oils to be 20–30% by wt. and about 5% by wt., respectively, whereas, the solubility in an AB and mineral oil is a factor of 3–10 lower. The solubility of the same in situants in alcohols are nearly the same at 20–30% and 1–6%, respectively.

Another drawback to current leak detection techniques is that conventional fluorescence leak detectors have used a very bright mercury vapor lamp with a UV filter. Commercial UV fluorescent leak detection devices also use halogen light sources. Other suitable UV light sources are disclosed Skoog, et al., *Principles of Instrumental Analysis,* Saunders College, 1980, Figure 5-2, p. 116, which lists components and materials for spectroscopic instruments and lists several light sources, including a xenon lamp, as a source of visible light.

Flashing UV light has been used for various applications in the past. Typically these applications use excited xenon in a light tube to provide continuous light or to provide UV energy for chemical curing reactions, such as in dental reconstruction. Up until our present invention, however, flashing UV light has not been recognized as beneficial for leak detection.

For example, U.S. Pat. No. 4,279,254 discloses a UV light used on medical patients to radiate the skin. The UV electrical light circuit, which is not battery operated, counts pulse flashes in order to automatically shut off and avoid over-exposure as a safety measure; U.S. Pat. No. 4,112,335 discloses a rapid pulse UV light apparatus in which a UV light source is fed as a high frequency pulse into a high pressure (3 atmosphere) xenon light tube to cure epoxy resin tooth caps; U.S. Pat. No. 4,550,275 discloses a high efficiency pulse light source as a xenon light source to excite lasers; U.S. Pat. No. 5,185,552 discloses a vacuum UV light source which provides a high output UV light source using low pressure hydrogen or deuterium in a hollow tube at wave lengths below 180 mm; U.S. Pat. No. 4,229,658 discloses a dental xenon light apparatus which supplies UV and visible light and is used to cure tooth restoration materials by focusing the light on a small area of a tooth; and U.S. Pat. No. 5,043,634 discloses a pulsed light source using a pulsed xenon light tube coupled with a phosphorus coating which emits different colors of visible light as a navigational aid.

Industries in which leak detection is important have not recognized that leaks can be detected by administering a fluorescing material to any system using a carrier fluid injected at any pressure, regardless of oil type, and detected using a UV lamp. It is also important to the present invention that the compounds being administered to the system for the purpose of providing the fluorescent or daylight-visible feature are, by themselves or by association with chemical families, improve certain properties of the oil or lubricant, and hence, these compounds or substantially chemically similar compounds are present in many oils or lubricants produced by oil and lubricant manufacturers. We define the term "in situants" to denote these compounds which are the same or substantially similar to those compounds already present in the oils or lubricants. We reserve the term "additive" to describe compounds added to a host fluid which are not identical or substantially similar to compounds already present in the host fluid. The compounds of the present invention are specifically chosen as in situants and should therefore not detrimentally impact the performance characteristics of the oil or lubricant, and in fact, these in situants may actually improve the properties of the oil or lubricant and at the same time provide the means to detect for leaks.

Moreover, we are not aware that anyone prior to our invention recognized that a daylight visible in situant can be used in addition to a UV fluorescing in situant to further facilitate visualization and location of leaks in vapor compression systems. Our recognitions provide a much simplified and advantageous method of leak detection.

An object of the present invention, is to provide a more effective method of introducing a fluorescent or daylight visible compound into a system to avoid the need for a system specific carrier oil and the time consuming process of replacing the filter to introduce the compounds.

Another object of the present invention is to provide a method of introducing an in situant into a system which will not degrade the performance of the system.

Another object of the present invention is to provide daylight visible or fluorescent in situants which are soluble in both the carrier fluid as well as the various types of refrigerant oils, i.e. synthetic or petroleum-derived. Solubility is desirable for at least two reasons. First, the in situant is dissolved in the carrier fluid alone for delivery into the refrigeration or air conditioning system. If the in situant were insoluble in the solvent, the in situant could precipitate or form a residue. As a result, inadequate amounts of in situant would be delivered into the system or insoluble residues could clog key system components, such as the expansion device, and cause operational problems. Second, once adequate amounts of the in situant are delivered into the system, the in situant must be soluble in the specific refrigerant lubricant used in the system, allowing the in situant to travel with the lubricant throughout the system to the location of the leak. The refrigerant/lubricant/in situant mixture then leaks into the atmosphere at the site of the leak, leaving a lubricant/in situant residue at the site which can be detected by visible light or by application of UV light to the area.

An objective of this invention is therefore to provide a carrier fluid which uses POE oil to replace some or all of an alcohol carrier fluid which is injected into a vapor compression system for leak detection.

Another object of this invention is to provide a method of introducing fluorescent or daylight-visible compounds, or mixtures thereof, into the oil or lubricant of a vapor compression system using a carrier solvent which need not be separated from the refrigerant oil or lubricant (system fluid) after its use as a carrier.

Yet another object of this invention is to provide a leak detection fluid which is comprised of fluorescent or daylight visible compounds already present as in situants in the systems oil or lubricant. In particular many fluorescent and daylight-visible dye compounds and families therefrom are used by oil and lubricant manufacturers as performance additives affecting anti-oxidation or anti-wear properties, for example, and the POE oil present in the carrier itself contains many additives to promote anti-oxidation, anti-wear, anti-corrosion, viscosity-improvements, and other performance factors.

Furthermore, another object of this invention is to provide a carrier fluid, comprised of POE oil or combinations of a POE oil and alcohol, which is soluble in all refrigeration oils or lubricants and which does not detrimentally affect the performance of the system.

Furthermore, another object of the present invention is to overcome the problems and disadvantages of conventional leak detecting light sources, which include power consumption and poor detection capabilities, by providing a high-efficiency xenon flashing light source. We have found that the advantage in using a flashing light instead of, for example, a continuous light source, is that it makes the fluorescing material more noticeable. That is, the flashing light provides the operator with a continuous comparison between a leaking region with fluorescence and the same region with normal ambient light, thereby making the fluorescing material appear to flash and easier to detect.

Normally, xenon lights inherently flash at a frequency so that the light is easily perceptible as continuous to the human eye. According to the present invention, however, the light has an adjustable on-off duty cycle, wherein the light may be off for 0.5 seconds or more. As a result of the longer off-time, such units use significantly less power and make battery powered units practical.

These objects have been achieved in accordance with the present invention by a method in which an in situant is introduced with a carrier fluid into a vapor compression system to detect system leaks.

The present invention also advantageously uses in situants with natural fluorescent characteristics which are not damaging to the performance of the oil, lubricant or refrigerant. Moreover, with the use of our invention and its general principles, the incorporation of certain in situants into the system actually benefits the performance, wear, stability, and/or life of the oil or lubricant when the in situant has anti-wear, anti-oxidant, viscosity improving, and/or dispersing properties.

According to the present invention, the extent to which the in situants are used is essentially only limited by the solubility of the in situant in the system fluid. The concentration of in situant should, generally speaking, be limited to an amount below which precipitation occurs, because precipitation of the in situant may be detrimental to the fluid system and performance.

Yet another advantage of the present invention is the use of mixtures of fluorescent materials and daylight visible in situants which, when used together, provide enhanced visual detection of the leakage and/or alter the fluorescent color of the fluorescent material to enhance detection of the mixture.

In accordance with the present invention, a method is utilizable by which an in situant and a fluid carrier can be introduced into a refrigerant system, regardless of the system pressure and temperature or whether the system is or is not open to the environment.

In summary, We have discovered that a carrier fluid comprised of POE oil, or POE oil in combination with one or more alcohols, preferably C1–C3 alcohols (i.e., methanol, ethanol, propanol), is an effective carrier by which to introduce in situants into a vapor compression system. Owing to the differences in chemical structure between alcohols and POE oils, there will also be fluorescent and daylight-visible in situants which are more or less soluble in each component, allowing more types and a larger number of in situant compounds to be incorporated into the combination carrier fluid. The properties of the POE, or POE-alcohol carrier fluid component are:

1. The carrier fluid must be miscible and compatible with AB, PAG mineral, and other POE oils;
2. The in situants must be soluble in POE oil if the carrier fluid is comprised entirely of POE oil;
3. The in situants must be soluble in POE and/or an alcohol if the carrier fluid is comprised of a POE oil/alcohol combination.

The benefits of using POE oil carrier fluid in this method for introducing fluorescent or daylight-visible in situants into the oil or lubricant of a vapor compression system are 1) POE oils are universally soluble in other oils and lubricants at low concentrations;
2) No provisions need to be made for removing the POE carrier fluid component after its use as a carrier;
3) In situants which are also fluorescent compounds or daylight-visible compounds, as well as those present in the POE oil, are administered to the system;
4) Similar quantities of fluorescent or daylight-visible in situants, relative to those possible with alcohol carriers alone, can be added to a system since they are readily soluble in POE oil. Also, larger quantities of certain in situants can be added to a system using POE oil relative to other oils since these certain in situants have higher solubilities in POE oil.
5) A larger diversity of fluorescent compounds or daylight-visible dyes or in situants can be added to a system since compounds can be selected which are soluble in alcohol or oil.

Xenon tubes used as a light source according to the present invention, advantageously produce a full spectrum of light very efficiently, without the generation of significant heat. This light can then be filtered to remove the visible and IR frequencies, leaving only the ultraviolet spectrum. The result is an intermittent, intense light of long wave ultraviolet black light or UV-A, typically in the 180 nm to 390 nm wavelength range of the electromagnetic spectrum.

Generally, the light sources for detecting fluorescing materials require a filter to filter-out visible light. Without a filter, the illumination of the fluorescing material is much less noticeable. Typically, the filter is a glass filter because the conventional continuous light source generates sufficient heat to damage inexpensive filters. According to the present invention, however, the xenon filter cooling effect advantageously results from a duty cycle in which there is a relatively slow on/off frequency.

Xenon light sources are generally in the form of xenon arc lamps, which burn continuously, or xenon flash tubes which are typically flashed at very high frequencies to approximate (i.e., appear to the naked eye as) a continuous light source. However, the present invention employs a xenon light which is turned on at a low frequency, with a very pronounced on and off cycle. Such xenon flashing lights generate significantly less heat and thus avoid potential safety concerns, reduce fabrication costs, and allow for the use of inexpensive plastic or glass lenses or the application of a UV filter material directly on the xenon bulb. Their utilization in leak detection of the type involved herein provides advantages not heretofore recognized.

Instead of using a continuous beam of UV light, it was found that, by introducing an intermittent (on/off duty cycle) UV light, the UV sensitive fluorescing material is more noticeable. The on/off UV light source allows a repeated comparison between the fluorescing leak indicator and the background, much like a flashing warning light is more noticeable to a driver at night. We also found that an adjustable flashing frequency allows the user to adjust the frequency to suit the user according to ambient light conditions. The intermittent light also advantageously consumes significantly less power, making possible the use of- lightweight, low-cost, portable, battery-powered units.

BRIEF DESCRIPTION OF THE DRAWINGS

Other objects, advantages and novel features of the present invention will become apparent from the following detailed description when considered in conjunction with the accompanying drawings wherein.

DETAILED DESCRIPTION OF PREFERRED EMBODIMENTS

A preferred embodiment of the present invention is to use a POE oil as a complete or partial replacement for an alcohol carrier since POE oil is miscible with other oils, e.g., mineral, AB, and PAG, used in vapor compression systems. Using POE oil in whole or in part as the carrier fluid also eliminates any need to later remove the POE carrier component since it is soluble in the system oil. In addition, POE oils are by design a lubricant or oil which offers additional oil or lubricant performance enhancement when used in the low concentrations prescribed by this invention and thus will not harm or detrimentally alter the properties of the primary oil. In fact, additives, or in situants, present in the POE oil or lubricant for anti-wear, anti-corrosion, anti-oxidation, viscosity, and other properties will be transferred to the host vapor compression system oil.

Since the chemical structure of alcohols and POE oils are different (e.g., longer carbon chains, different functional groups), the solubility of fluorescent compounds and daylight-visible dyes will vary in each of these components and not necessarily be the same. Therefore, POE oil in combination with an alcohol provides a useful means to vary the type and amount of fluorescent compounds and daylight-visible dye in situants used for a particular leak detection application or formulation. The solubilities of various fluorescent compounds in alcohols are described in application Ser. No. 08/788,780, incorporated herein by reference.

We have measured the solubility of several fluorescent and daylight-visible in situants in various POE oils and prepared solutions comprised solely of the POE carrier fluid (i.e., no alcohol in the carrier fluid) and these in situants. An example composition is 30 wt. % N-phenyl-l-naphthylamine and 70 wt. % POE oil. We have found that administering this solution to an oil in the proportions of about 1:120 yields an easily detectable fluorescence at the point of leakage when illuminated by UV light. The final composition for a 1:120 dilution in the system oil or lubricant is approximately 0.58% POE oil and 0.25% N-phenyl-1-naphthylamine. We have also observed that the intensity of the fluorescence due to the in situant can be enhanced by adding small quantities of a coumarin compound having similar emission wavelengths. For example, a composition was prepared with 30 wt. % N-phenyl-1-naphthylamine, 1 wt. % 7-diethylamino-4-methylcoumarin (coumarin 1) and 69 wt. % POE oil. The final composition for a 1:120 dilution in the system oil or lubricant is approximately 0.58% POE oil, 0.25% N-phenyl-1-is naphthylamine, and 83 ppm coumarin 1. The preferred final composition of the fluorescing or daylight visible in situant in the system oil will be below the solubility limits. For example, N-phenyl-1-naphthylamine is soluble to about 10 weight percent in AB oil, and 3 weight percent in mineral oil.

Another example of a formulation consists of using 20% N-phenyl-1-naphthylamine, 1% coumarin 1, and 0.5% methylesculetin (a coumarin derivative) in carrier fluid diluted 1:180 when used in a vapor compression system oil or lubricant. The final composition in the vapor compression system at this dilution typical to this invention would be 0.11% N-phenyl-1-naphthylamine, 56 ppm coumarin 1, and 28 ppm methylesculetin. Another formulation consisted of 20% N-phenyl-1-naphthylamine, 1% coumarin 1, 0.5% coumarin 6, and 0.5% methylesculetin in remainder carrier.

Examples of other in situants found useful for fluorescent and daylight-visible leak detection compositions, which we measured to be soluble in POE oil or alcohols, and have fluorescent or daylight-visible properties, include N-phenyl-2-naphthylamine, 2-aminobenzothiazole, phenothiazine, diphenylamine, 2'-(2-benzothiazolyl)-6'-hydroxybenzothiazole, anthraquinones (purpurin quinalizarin, anthrarufin), thiazole yellow G, primuline (a thiazole), 2-carbamoyl-6-hydroxybenzothiazole, and 4-(phenylazo)-diphenylamine. Examples of coumarins which could be used in combination with these in situants include 4-methylesculetin (a coumarin), coumarin 153, 7-diethylamino-4-methylcoumarin, 6,7-dihydroxy-4-methylcoumarin, and 3-(2-benzothiazolyl)-7-(diethylamino) coumarin).

The useful concentrations of these and other fluorescent and daylight-visible compounds is dependent on the quantum efficiency (visible light emitted relative to visible or UV light absorbed) and the solubility in POE oil and the system oil. For example, coumarin 1 at 1% by weight in POE oil fluoresces similarly to N-phenyl-1-naphthylamine at 30% by weight. Thus, less coumarin 1 would be required to achieve a particular visibility so high solubilities of the compound in the POE carrier fluid are not essential. Conversely, the in situant N-phenyl-2-naphthylamine requires more material for the same fluorescent visibility and therefore it would be necessary that this compound have a high solubility in the POE oil to be useful in the leak detection method of this invention.

Compounds which dissolve in a carrier fluid and are used as in situant daylight visible or fluorescent agents must also be compatible with the refrigerants, lubricants, and construction materials used in the system, because these in situants remain in the system after the carrier fluid has been removed by the filter-dryer. The present invention teaches that by using in situants, as opposed to other daylight visible dyes or fluorescent compounds, compatibility and the performance properties of the system oil should not be affected. One measure of this effect is through a wear test, more specifically ASTM method D2670. For example, wear tests performed according to ASTM D2670 for a 0.1 weight percent composition of N-phenyl-1-naphthylamine, a fluorescent in situant also known in the oil industry as an anti-oxidant, in POE oil, show no effect on the wear properties of the base oil. It has been shown by van der Waal, G., *Improving the Performance of Synthetic Base Fluids with Additives*, J. Synth. Lubr., Vol. 4, No. 4, pp. 267–282 (1987), that alkylated diphenylamines and alkylated phenyl-2-naphthylamines can actually improve the wear properties of oils and lubricants, as measured by ASTM standard D2670.

Numerous compounds are often added to lubricants and oils for various reasons, such as for anti-oxidation, anti-wear, anti-friction, dispersion improvement, and viscosity index improvement. Such compounds include triazoles, phenylnaphthylamines, alkylated hydroquinones, benzothiazolines, benzothiazoles, benzotriazoles, aminoalklyphenothiazines, aminophenylbenzothiazoles, phenothiazines, phenols, polyhydroxy-anthraquinones, 1,3, 4-thiadiazoles and alkyl, aryl or alkylaryl derivatives of these compounds. Specific compounds include 2-aminobenzothiazole, benzothiazole, N-phenyl-1-naphthylamine, 2,2-dimethylbenzothiazoline, bis (benzothiazoline), benzotriazole, methylene bis(dibutyl dithiocarbamate), 2,6-di-tert-butyl-4-methylphenol, or 2,5-dimercapto-1,3,4-thiadiazole.

Furthermore, additives, compounds and derivatives containing other organic groups such as alkyl, amino, alkenyl, alkylnyl, cycloalkyl, aryl, or substituted aralkyl are also incorporated into lubricating and other working fluids, such as hydraulic fluids, by grafting the compound to a polyolefin backbone such as polyethylene or polypropylene (see U.S. Pat. Nos. 4,708,810; 4,948,524; 5,147,569; and 5,271,856). Additionally, organo-metallic compounds such as molybdenum dialkylphosphorodithioate and Zinc octyldithiophosphate are also used because of their anti-wear, anti-oxidation and anti-friction properties.

Phenylnaphthylamines and diphenylamines, and their derivatives containing alkyl, aryl, or alkylaryl groups, are known anti-oxidants and oxidation stability additives for petroleum-based or synthetic lubricating oils (see U.S. Pat. Nos. 3,944,492; 4,064,059; 4,157,970; 4,179,386; 4,320, 018; and 5,523,008). Examples of phenylnaphthylamines include N-phenyl-1-naphthylamine, N-phenyl-2-naphthylamine, N-(4-cumylphenyl)-1-naphthylamine, p-tert-dodecylphenyl-2-naphthylamine. Examples of diphenylamines and dialkylphenylamines include diphenylamine, dioctyldiphenylamine, and didecyldiphenylamine. Phenylnaphthylamines and dialkyldiphenyl amines are generally used as antioxidants in oils in concentrations of up to about 5% by weight. These compounds are also generally soluble in alcohols, mineral oils, and synthetic oils.

Several coumarin compound derivatives such as 2,3,6,7-tetrahydro-9(trifluoromethyl)-1H,5H,11H-[1]benzopyrano[6,7,8,ij]quinolizin-11-one (coumarin 153) also fluoresce and are sometimes also incorporated in gasoline and hydrocarbon liquids, e.g., oils, as additives for tracing leaks in underground ambient pressure storage tanks and process lines without affecting the properties of the organic fluid. These compounds can also be used to enhance the fluorescent intensity of the in situant compounds if the emission is at or near the same wavelength, and the low concentrations of these compounds which can invoke an intense fluorescence is small. Also, many of these coumarin derivatives contain functional groups which are the same or related to those present in in situants and therefore would be likely to impose favorable, nor detrimental, qualities to the oil or lubricant. For example, fluorescent coumarin compound, 7-(2H-naphtho[1,2-d]-triazol-2-yl)-3-phenyl-coumarin, is used as an optical brightener and sometimes also as a brightener and additive for thermoplastic materials. This compound is soluble in alcohol and oils and contains the triazole sub-structure which is used as an oil and lubricant additive. Another coumarin compound, 3-(2-benzothiazolyl)-7-(diethylamino)coumarin), contains the benzothiazole group and this compound would be considered a substituted benzothiazole which is a known lubricant and oil additive.

Table 1 lists examples of in situant compounds which are commonly used as additives in lubricants and oils, but which have not been recognized as advantageous for fluorescent leak detection.

TABLE 1

| ADDITIVE NAME | KNOWN SUPPLIER |
|---|---|
| N-phenyl-1-naphthylamine | Aldrich Chemical Co., Milwaukee, WI |
| N-phenyl-2-naphthylamine | Aldrich Chemical Co., Milwaukee, WI |
| benzothiazole | Aldrich Chemical Co., Milwaukee, WI |
| 2-aminobenzothiazole | Aldrich Chemical Co., Milwaukee, WI |
| 2,2-dimethyl benzothiazoline | ChemService, West Chester, PA |
| diphenylamine | Aldrich Chemical Co., Milwaukee, WI |
| 3-(2-benzothiazolyl)-7-(diethylamino)coumarin) | Aldrich Chemical Co., Milwaukee, WI |
| purpurin (polyhydroxy-anthraquinone) | Aldrich Chemical Co., Milwaukee, WI |

Since the ring structures of these compounds are generally responsible for the fluorescing properties, substituted derivatives of these structures would be expected by those skilled in the art to have similar fluorescing properties and in situant benefits. The general structure of the cyclic compounds summarized in Tables 1 and 2 which can fluoresce with UV excitation include coumarin compounds and derivatives thereof with the following structure:

where G comprises groups comprising C, H, halogens, N, and/or S and j greater than or equal to 0; the in situant phenylnaphthylamine compounds and derivatives thereof:

where $R_1$, $R_2$, and $R_3$ are groups comprising any combination of C, H, halogens, N, S, and/or O in cyclic or acyclic structures; the in situant dialkyldiphenylamine compounds and derivatives thereof:

where $R_4$ and $R_5$ are groups comprising any combination of C, H, halogens, N, S, and/or O in cyclic or acyclic structures; the in situant benzothiazoline compounds and derivatives thereof:

where $R_6$, $R_7$, $R_8$ and $R_9$ are cyclic or acyclic groups comprising C, H, halogens, N, S, and/or O; the in situant benzothiazole and derivatives thereof:

where $R_{10}$ and $R_{11}$ are cyclic or acyclic groups comprising C, H, halogens, N, S, and/or O; and the in situant polyhydroxy-anthraquinones:

where k is greater than or equal to one.

Other heterocyclic and multiple-cyclic structures related to these in situants which can fluoresce under UV excitation include naphthalene, quinoline, isoquinoline, purine and carbazole, and derivatives thereof comprising C, H, halogens, S, N, and/or O.

These in situant compounds can be mixed with other in situant compounds to produce various visible and fluorescent colors. Or, the in situants can be with small concentrations of oil-soluble coumarin compounds to impart a more intense fluorescence at or near the same emissions wavelength, or to alter the emission wavelength of the in situant.

Figure 5:
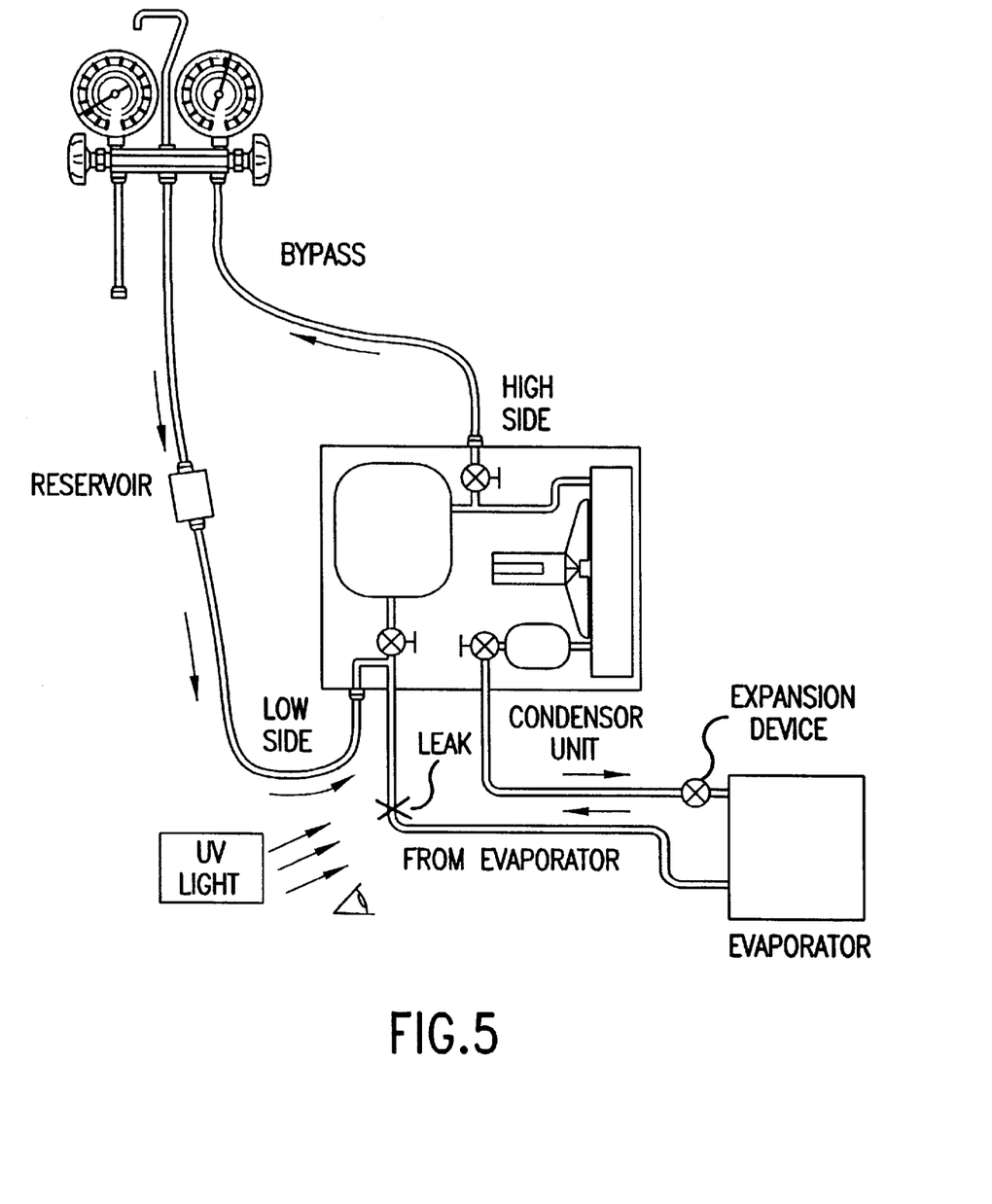
FIG. 5 is a schematic representation of a method of introducing an additive into a conventional fluid system with a UV light source being directed at an area with a leak and being observed.

The mixture of in situant and carrier fluid may be is introduced into a refrigerant system by connecting a reservoir containing the mixture in a bypass between the high pressure side and the low pressure side of the refrigeration system compressor is shown in FIG. 5. By introducing flow through the bypass, the mixture in the bypass reservoir is driven into the low pressure side of the system, and having done so, the bypass can be disconnected.

Consequently, the leak check fluid (i.e. the in situant and carrier fluid) does not have to be oil specific, because the POE oil is compatible with all oils potentially present in such systems. This novel method is contrary to the current practice of dissolving a dye in a lubricating oil which may not be compatible with another unknown oil in the system as noted above, and using additives which are not already present in the oil (i.e., not an in situant).

A low (on-off) frequency xenon lamp coupled with a UV filter is used with great advantage to provide the UV light. A conventional high pressure (up to as much as 4 atmosphere, quartz glass UV lamp is preferably used (such as manufactured by Amglo Kemlite Laboratories, Inc.). Quartz glass is preferred because of high UV transmissivity. Because the duty cycle for such a is slow-flashing (i.e., flashing in the sense of turning the light completely on and off) light allows for greater cooling, the UV filter can either be applied directly to the quartz bulb surface or a thin glass (rather than a thick glass) or plastic filter can be used. In a preferred embodiment, the flash rate is from about 4 flashes per second to about 1 flash every four seconds.

Figure 1:
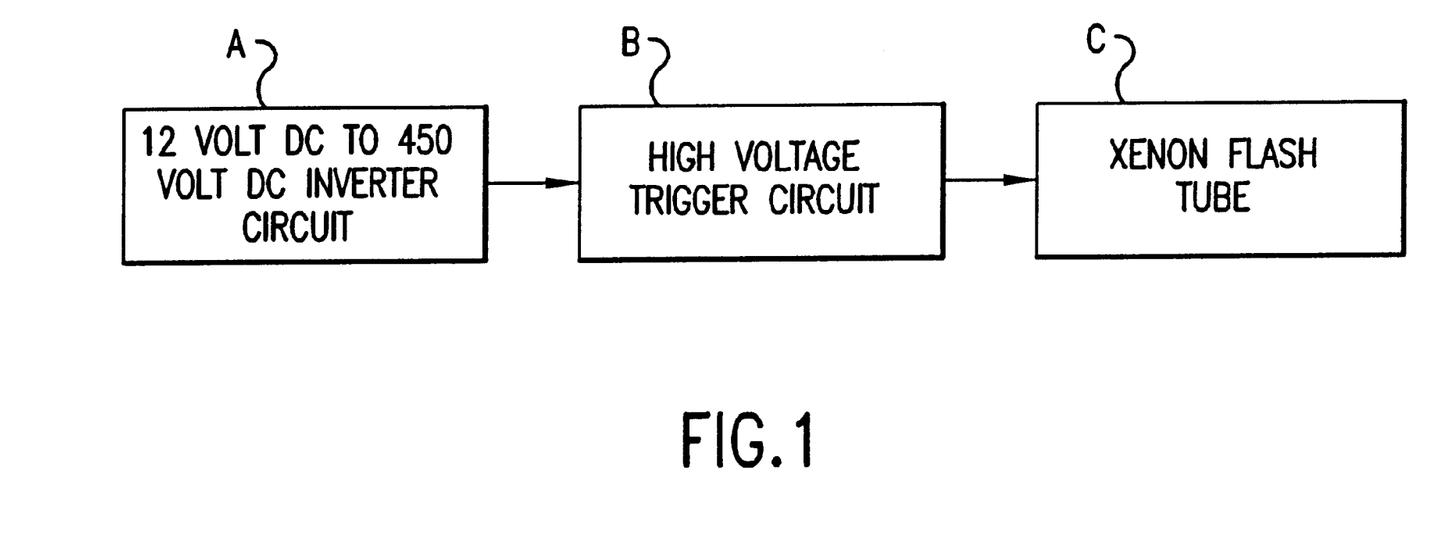
FIG. 1 is an overall schematic of a xenon flash the circuit used in connection with the detection method of the present invention.

In a currently preferred embodiment, the electrical circuit is advantageously operated from a battery power source to provide a high voltage D.C. power. A fundamental electrical circuit as seen in FIG. 1 comprises a high voltage section A which provides approximately 300–500 volts from a conventional battery power supply (not shown) and a trigger section B which intermittently provides approximately 6,000 to 11,000 volts (from the battery power source) to trigger the xenon flash tube C and cause the xenon light to flash. The frequency of the trigger voltage provided by the circuit B is, however, adjustable in order to adjust the on/off duty cycle of the UV light.

To specifically implement the above described high voltage and trigger voltage circuits A and B, three different embodiments of adjustable duty cycle xenon lamp circuits are discussed in further detail below with reference to FIGS. 2, 3 and 4.

The xenon flash tube circuit in FIG. 1 includes a high voltage DC to DC inverter, a trigger circuit and a xenon flash tube.

The inverter consists of a 12 volt source from a battery which is applied to an oscillator circuit which produces a high frequency 12 volt pulse fed into a step up transformer. The output of the transformer, typically 450 volts, is rectified to direct current using a voltage tripler circuit.

The high voltage of approximately 450 volts is connected to each of the two terminals on the xenon tube. This high voltage is also used to fire a SCR (Silicon Controlled Rectifier), which presents a pulse to a high voltage trigger coil at a rate determined by an RC constant and the firing voltage of the neon tubes found across the gate and anode of the SCR. The output of the trigger coil is connected to the center trigger wire of the xenon tube. When the SCR fires, a 450 volt pulse is sent to the trigger coil which steps up the voltage to 6,000 to 11,000 volts depending on the coil used. The resulting voltage applied to the xenon tube causes the tube to light and inherently flash.

Figure 2:
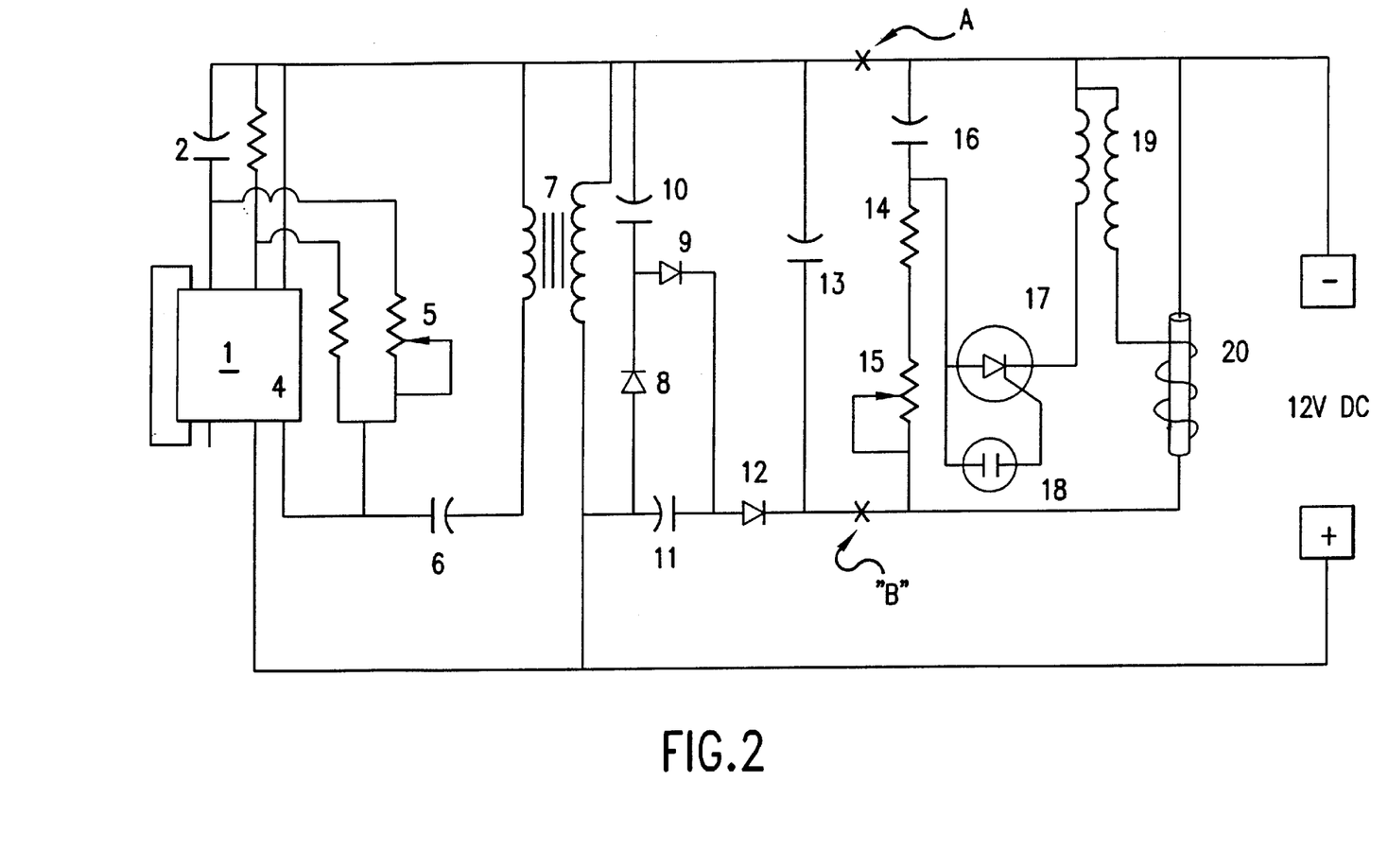
FIG. 2 is a schematic diagram of a first embodiment of a xenon lamp circuit used in connection with the detection method of the present invention.

Referring now to FIG. 2, the high voltage section A comprises a low-voltage audio amplifier 1, powered by 12 VDC power source. The amplifier 1 is used in a stable multivibrator mode with a frequency of above 1000 kilohertz as determined by capacitor 2 and variable resistor 5. The output at pin 4 at the amplifier 1 is a square wave that drives a transformer 7 via a capacitor 6. Transformer 7 is an audio transformer connected with a 4 or 8 ohm secondary as the primary. The 1200 ohm secondary delivers 450 volts peak to peak to diode 8, 9, 12 and capacitor 10, 11, 13 comprising of a voltage-tripler circuit which produces a 450 volt output at point "B".

For the xenon flash tube trigger section B, a 450 VDC voltage is applied to capacitor 16 through resistors 14, 15, the latter being variable. By varying the resistance of resistor 15, the charge time for full voltage on capacitor 16 can be varied to control the flash cycle time of the flash tube 20. The xenon flash tube 20 has the power supply voltage of 450 volts across its terminals, but requires a trigger voltage greater than 6000 volt to the trigger anode to cause the xenon tube 20 to fire. The trigger circuit consists of the capacitor 16, SCR 17, neon lamp 18, and trigger transformer 19. The capacitor 16 charges until the neon lamp 18 has approximately 90 volts across its terminals and breaks down, creating a conductive path between the gate and the anode of SCR 17 which then fires the SCR providing a conductive path between the anode and cathode. The full voltage of the capacitor 16 is passed through the SCR 17 and to the primary of the transformer 19. A stepped up secondary voltage of 10,000 volts to the flash tube anode results and fires the xenon flash tube 20. The recharge cycle begins again.

Figure 3:
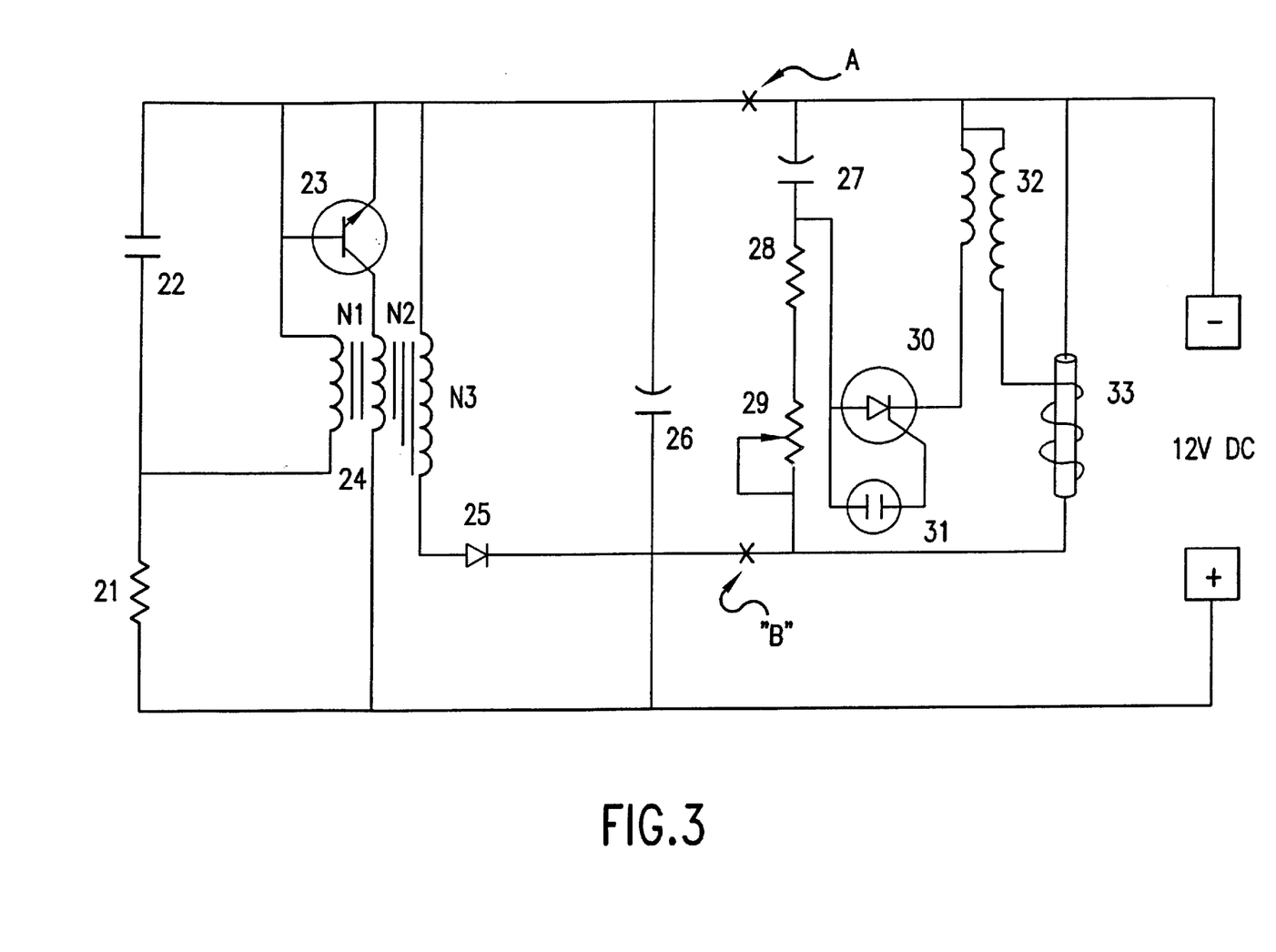
FIG. 3 is a schematic diagram of a second embodiment of a xenon lamp circuit used in connection with the detection method of the present invention.

In the embodiment of FIG. 3, the circuit uses a pot core transformer 24 which performs two functions. Coil N1 provides a feedback to the driving transistor 23 configured in a modified Hartly oscillator. NPN transistor 3 oscillates at a frequency based on resistor 21, capacitors 22, 26 and switches a pulsed 12 VDC to the primary (N2 winding) of the transformer 24. Coil N2 provides the primary winding of a transformer. The voltage is stepped up in secondary coil N3 of the transformer and is rectified and filtered by diode 25 and capacitor 6 producing a output voltage to the flash tube trigger circuit at point "B".

A 275 VDC voltage is applied to the capacitor 27 through resistor 28 and 29. By changing the resistance of the resistor 29, the full voltage charge time on the capacitor 27 can be varied to control the flash recycle time of the flash tube 33. The flash tube 33 has a power supply voltage of greater than 275 volts across its terminals but requires a trigger voltage greater than 6,000 volts to the trigger anode to cause the xenon tube 33 to fire. The trigger circuit consists of the capacitor 27, SCR 30, neon lamp 31, and transformer 32. Capacitor 27 charges until neon lamp 31 has approximately 90 volts across its terminals and breaks down, creating a conductive path between the gate and the anode of SCR 30 that fires the SCR. The full voltage of the capacitor 27 is passed through the SCR 30 and to the primary of transformer 12 resulting in a stepped up secondary voltage of at least 6,000 volts to the flash tube anode which fires the xenon flash tube 33. The recharge cycle begins again.

Figure 4:
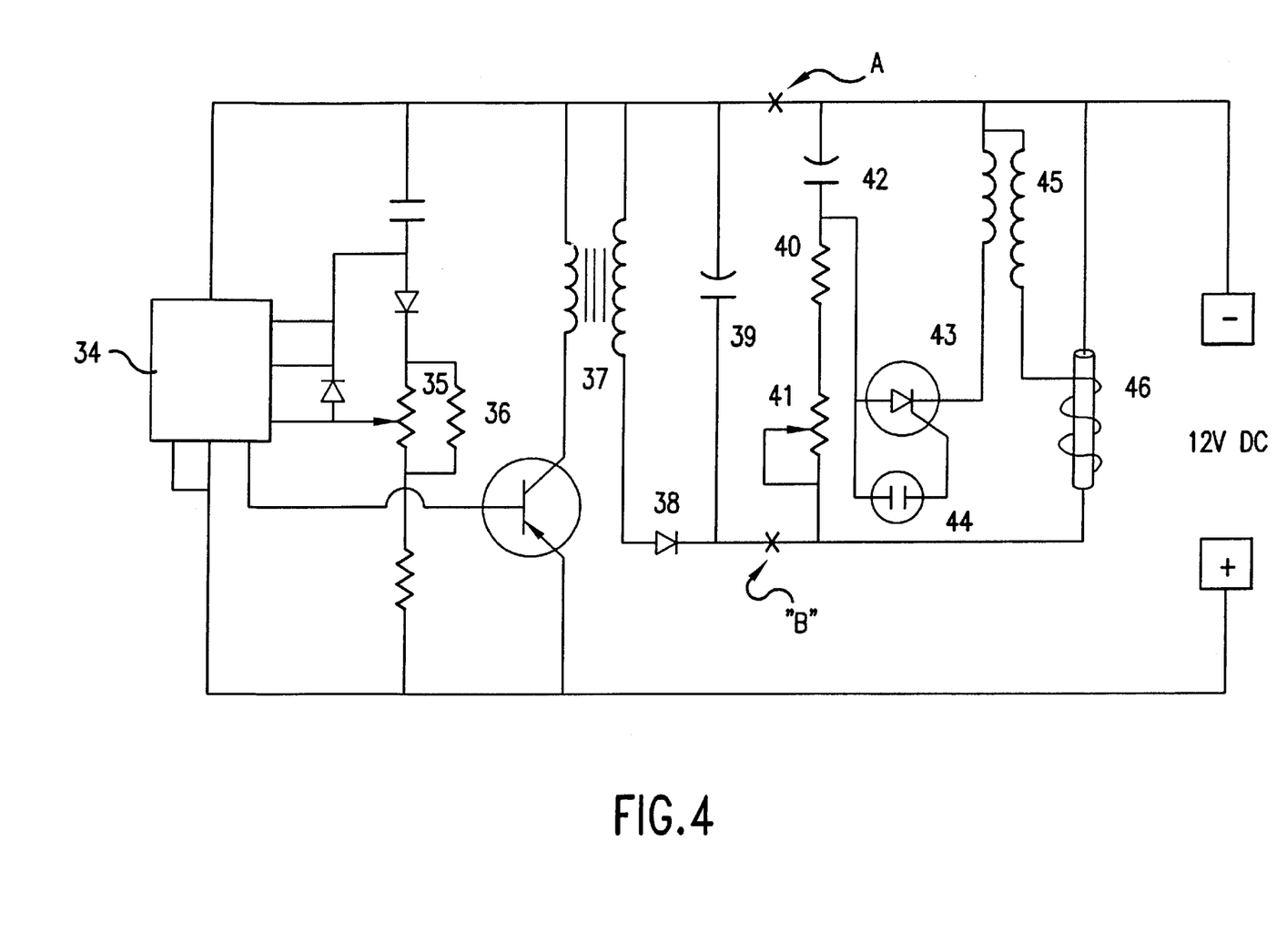
FIG. 4 is a schematic diagram of a third embodiment of a xenon lamp circuit used in connection with the method of the present invention.

In the embodiment of FIG. 4, the integrated circuit (IC) is a 555 timer circuit 34, powered by 12 VDC, used in a stable multivibrator mode. The frequency output of IC 34 is determined by potentiometer resistor 35. The IC 34 provides a pulsed voltage to the base of NPN transistor 36 which switches a pulsed 12 VDC to the primary of setup transformer 37. The voltage is stepped up in the secondary winding of the transformer and is then rectified and filtered by diode 38 and capacitor 39 producing an output voltage to the flash tube trigger circuit at point "B".

A greater than 275 VDC voltage is applied to capacitor 42 through resistors 40, 41, the latter being variable. By changing the resistance of variable resistor 41, the full voltage charge time on capacitor 42 can be varied to control the flash recycle time of the flash tube 46. The flash tube 46 has the power supply voltage of greater than 275 volts across its terminals but requires a trigger voltage greater than 6,000 volts to the trigger anode to cause the xenon tube 46 to fire. The trigger circuit consists of capacitor 42, SCR 43, neon lamp 44, and trigger transformer 44. Capacitor 42 charges until neon lamp 44 has approximately 90 volts across it's terminals and breaks down, creating,a conductive path between the gate and the anode of SCR 43 that fires the SCR providing a conductive path between the anode and cathode. The full voltage of capacitor 42 is passed through SCR 43 and to the primary of transformer 45 resulting in a stepped up secondary voltage of 6,000 volts to the flash tube anode which fires the xenon flash tube 46. The recharge cycle begins again.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of introducing at least one in situant into an oil or lubricant of a vapor compression system for the purpose of detecting leaks in the vapor compression system components, comprising the steps of:

dissolving the at least one in situant in a carrier fluid of pure polyol ester oil or a polyol ester oil and alcohol solution, delivering the at least one in situant and the carrier fluid into a vapor compression system fluid, leaving the at least one in situant dissolved in the combined carrier/system fluid solution, and removing any immiscible or slightly miscible components of the carrier fluid from the system fluid, thereby leaving the miscible carrier fluid components and at least one in situant dissolved in the system fluid, wherein the at least one in situant is an oil or lubricant additive selected from the group consisting of anti-oxidation, anti-wear, anti-friction, dispersion improvement, viscosity index improvement additives.

2. The method of claim 1, further comprising the step of delivering an amount of the at least one in situant into the system in concentrations of up to the solubility limit of the at least one in situant in the system fluid.

3. The method of claim 1, wherein the at least one in situant comprises at least one compound which is soluble in the system fluid and the carrier fluid and has fluorescent properties.

4. The method of claim 1, wherein the at least one in situant comprises at least one organic compound that emits color in the visible spectrum.

5. The method of claim 1, wherein the at least one in situant comprises at least one fluorescent compound and at least one organic compound which emits color in the visible spectrum.

6. The method of claim 1, wherein the system oil or lubricant comprises at least one of polyalkylene glycol, polyol ester, mineral oil and alkylbenzene.

7. The method of claim 1, wherein one or more coumarin compounds are used with the at least one in situant.

8. The method of claim 1, wherein the carrier fluid comprises at least one of ethanol, methanol, and 2-propanol in solution with polyol ester oil.

9. The method of claim 1, wherein the at least one in situant comprises a heterocyclic molecule comprising at least one cyclic group comprising C, H, halogens, S, N, and O.

10. The method of claim 1, wherein the at least one in situant comprises a molecule comprising at least one cyclic group comprising C, H, halogens, S, N, and O.

11. The method of claim 1, wherein the at least one in situant comprises an organo-metallic compound.

12. The method of claim 1, wherein the at least one in situant is used in combination with one or more compounds selected from the group consisting of coumarin and derivatives thereof shown by the following structure, wherein G represents groups comprising C, H, halogens N, and j is greater than or equal to 0.

13. The method of claim 1, wherein the at least one in situant is selected from the group consisting of phenylnaphthylamines shown by the following structure, wherein $R_1$, $R_2$, and $R_3$ are groups comprising at least one of C, H, halogens, N, S, and O in cyclic or acyclic structures.

14. The method of claim 1, wherein the at least one in situant is selected from the group consisting of diphenylamines shown by the following structure, wherein $R_4$ and $R^5$ are groups comprising at least one of C, H, halogens, N, S, and O in cyclic or acyclic structures.

15. The method of claim 1, wherein the at least one in situant is selected from the group consisting of benzothiazolines shown by the following structure, wherein $R_6$, $R_7$, $R_8$ and $R_9$ are groups comprising at least one of C, H, halogens, N, S, and O in cyclic or acyclic structures.

16. The method of claim 1, wherein the at least one in situant is selected from the group consisting of benzothiazoles, shown by the following structure, wherein $R_{10}$ and $R_{11}$ are groups comprising at least one of C, H, halogens, N, S, and O in cyclic or acyclic structures.

17. The method of claim 1, wherein the at least one in situant is selected from the group of polyhydroxyanthraquinone compounds where k is greater than or equal to one with the structure:

18. A leak detection method, comprising the steps of:
dissolving an organo-metallic in situant compound comprising at least one of C, H, halogens, N, S, and O in cyclic or acyclic structures in a carrier fluid comprising an alcohol in solution with polyol ester oil;
delivering the compound and the carrier fluid into a refrigeration system comprising a fluid system; and
causing the compound to fluoresce at any point in the system where there is a leak.

19. The method of claim 18, wherein the step of introducing the in situant compound into the system is effected in concentration up to the solubility limit of the compound in the system fluid.

20. The method of claim 18, wherein the system oil or lubricant comprises at least one of polyalkylene glycol, polyol ester, mineral oil and alkylbenzene.

21. The method of claim 18, wherein the carrier fluid comprises at least one of ethanol, methanol and 2-propanol in solution with polyol ester oil.

22. A leak detection method comprising the steps of:
dissolving an in situant capable of fluorescing into a carrier fluid comprising a polyol ester oil and alcohol solution;
introducing the carrier fluid and in situant into a refrigeration system comprising a system fluid comprising at least one of polyalkylene glycol, polyol ester, mineral oil and alkylbenzene; and
causing the compound to fluoresce at any point in the system where there is a leak, wherein the compound is soluble in the system fluid and comprises at least one of phenylnaphthylamines:

where $R_1$, $R_2$, and $R_3$ are groups comprising at least one of C, H, halogens, N, S, and O in cyclic or acyclic structures; dialkyldiphenylamines:

where $R_4$ and $R_5$ are groups comprising at least one of C, H, halogens, N, S, and O in cyclic or acyclic structures; organometallic compounds comprising molecular groups comprising at least one of C, H, halogens, N, S, and O in cyclic or acyclic structures in combination with at least one metal; benzothiazolines:

where $R_6$, $R_7$, $R_8$ and $R_9$ are groups comprising at least one of C, H, halogens, N, S, and O in cyclic or acyclic structures; benzothiazoles:

where $R_{10}$, and $R_{11}$ are groups comprising at least one C, H, halogens, N, S, and O in cyclic or acyclic structures; and a group of compounds derived from the polyhydroxyanthraquinone structure with k greater than or equal to 1:

23. The method of claim 22, wherein the step of introducing the in situant compound into the system is effected in concentrations of up to the solubility limit of the compound in the system fluid.

24. The method of claim 22, wherein one or more coumarin compounds are used in combination with an in situant compound.

25. The method of claim 22, further comprising removing immiscible components of the carrier fluid from the system fluid.

26. The method of claim 22, wherein the carrier fluid comprises at least one of ethanol, methanol and 2-propanol in solution with polyol ester oil.

27. A method of detecting leaks in a refrigeration system comprising a fluid system, comprising the steps of:

dissolving a fluorescing in situant compound into a carrier fluid comprising polyol ester oil and an alcohol;

delivering the in situant compound and the carrier fluid into the fluid system; and detecting the leak with a UV lamp.

28. The method of claim 27, wherein the UV lamp is a xenon flash tube.

29. The method of claim 28, wherein the xenon flash tube comprises a quartz glass.

30. The method of claim 28, wherein the xenon flash tube is filled with a xenon gas mixture at a pressure of less than about 4 atmospheres.

31. The method of claim 28, wherein the xenon flash tube comprises a trigger circuitry means for obtaining an adjustable or a preset flash rate.

32. The method of claim 31, wherein the means produces a flash rate from about 4 flashes per second to about 1 flash every four seconds.

33. The method of claim 28, wherein the xenon flash tube comprises a filter glass with a high degree of internal transmittance in the 180 to 390 nm ultraviolet wavelength range.

34. The method of claim 28, wherein the xenon flash tube comprises an ultraviolet flash pulse circuit.

35. A method of introducing N-phenyl-1-naphthylamine into an oil or lubricant of a vapor compression system for the purpose of detecting leaks in the vapor compression system components, comprising the steps of:

dissolving the N-phenyl-1-naphthylamine in a carrier fluid of pure polyol ester oil or a polyol ester oil and alcohol solution, delivering the N-phenyl-1-naphthylamine and the carrier fluid into the vapor compression system fluid, leaving the N-phenyl-1-naphthylamine dissolved in the combined carrier/system fluid solution, and removing any immiscible or slightly miscible components of the carrier fluid from the system fluid, thereby leaving the miscible carrier fluid components and N-phenyl-1-naphthylamine dissolved in the system fluid.

36. The method of claim 35, wherein said dissolving further comprises dissolving one or more coumarin compounds or one or more additional in situants in the carrier fluid.

* * * * *